(12) United States Patent
Houwink et al.

(10) Patent No.: US 12,168,314 B2
(45) Date of Patent: *Dec. 17, 2024

(54) METHOD FOR CONSOLIDATING AN ADDITIVELY MANUFACTURED PIECE

(71) Applicant: 9T LABS AG, Zürich (CH)

(72) Inventors: Chester Houwink, Zürich (CH); Giovanni Cavolina, Zürich (CH)

(73) Assignee: 9T Labs GmbH, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,198

(22) Filed: Jan. 2, 2024

(65) Prior Publication Data

US 2024/0131755 A1 Apr. 25, 2024

Related U.S. Application Data

(62) Division of application No. 17/434,668, filed as application No. PCT/EP2020/055365 on Feb. 28, 2020, now Pat. No. 11,858,180.

(30) Foreign Application Priority Data

Mar. 5, 2019 (EP) .................................. 19160819

(51) Int. Cl.
| | | |
|---|---|---|
| *B29C 43/10* | (2006.01) | |
| *B29C 39/10* | (2006.01) | |
| *B29C 43/12* | (2006.01) | |
| *B29C 64/30* | (2017.01) | |
| *B29C 64/386* | (2017.01) | |

(Continued)

(52) U.S. Cl.
CPC .............. *B29C 43/10* (2013.01); *B29C 39/10* (2013.01); *B29C 43/12* (2013.01); *B29C 64/30* (2017.08); *B29C 64/386* (2017.08); *B29C 71/02* (2013.01); *B33Y 40/00* (2014.12); *B33Y 40/20* (2020.01); *B33Y 50/00* (2014.12);

(Continued)

(58) Field of Classification Search
CPC ...... B29C 2043/3261; B29C 2043/562; B29C 43/10

See application file for complete search history.

(56) References Cited

U.S. PATENT DOCUMENTS

| | | |
|---|---|---|
| 4,167,430 A | 9/1979 | Arachi |
| 4,264,556 A | 4/1981 | Kumar |

(Continued)

FOREIGN PATENT DOCUMENTS

| | | |
|---|---|---|
| EP | 0233134 | 8/1987 |
| JP | 62-135347 | 6/1987 |
| WO | 2016/189312 | 12/2016 |

OTHER PUBLICATIONS

Search Report and Written Opinion for International Application No. PCT/EP2020/055365 mailed Aug. 25, 2020 (11 pages).
Notice of Allowance dated Aug. 9, 2023 in U.S. Appl. No. 17/434,668.

*Primary Examiner* — Atul P. Khare
(74) *Attorney, Agent, or Firm* — Dicke, Billig & Czaja, PLLC

(57) ABSTRACT

Methods and systems for consolidating an additively manufactured piece. In one embodiment, methods include the step of combining the additively manufactured piece with another piece, for example with another additively manufactured piece or with a piece that is not additively manufactured (e.g. an insert, foam, etc.), so that during a consolidation step, those pieces are assembled or connected together.

21 Claims, 9 Drawing Sheets

(51) Int. Cl.
*B29C 71/02* (2006.01)
*B33Y 40/00* (2020.01)
*B33Y 40/20* (2020.01)
*B33Y 50/00* (2015.01)
B29C 43/32 (2006.01)
B29C 43/56 (2006.01)
B29C 64/00 (2017.01)
B29K 307/04 (2006.01)

(52) U.S. Cl.
CPC ................ *B29C 2043/3261* (2013.01); *B29C 2043/562* (2013.01); *B29K 2307/04* (2013.01)

(56) References Cited

U.S. PATENT DOCUMENTS

| | | |
|---|---|---|
| 4,492,607 A | 1/1985 | Halcomb |
| 4,704,240 A | 11/1987 | Reavely |
| 4,755,341 A | 7/1988 | Reavely |
| 4,889,668 A | 12/1989 | Kemp |
| 4,940,563 A | 7/1990 | Kromrey |
| 6,174,484 B1 | 1/2001 | Thompson et al. |
| 11,241,842 B2 | 2/2022 | Gandhi et al. |

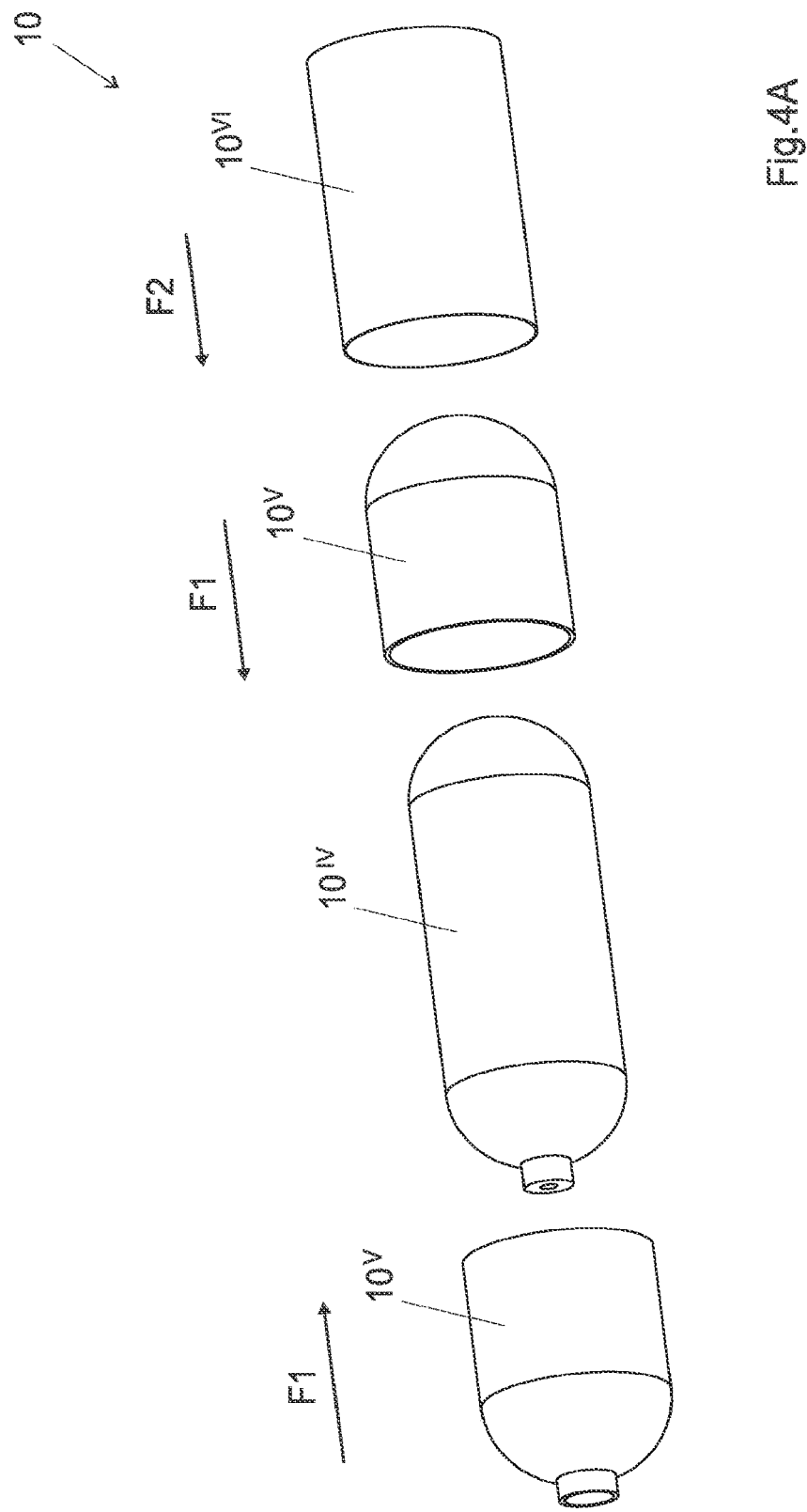

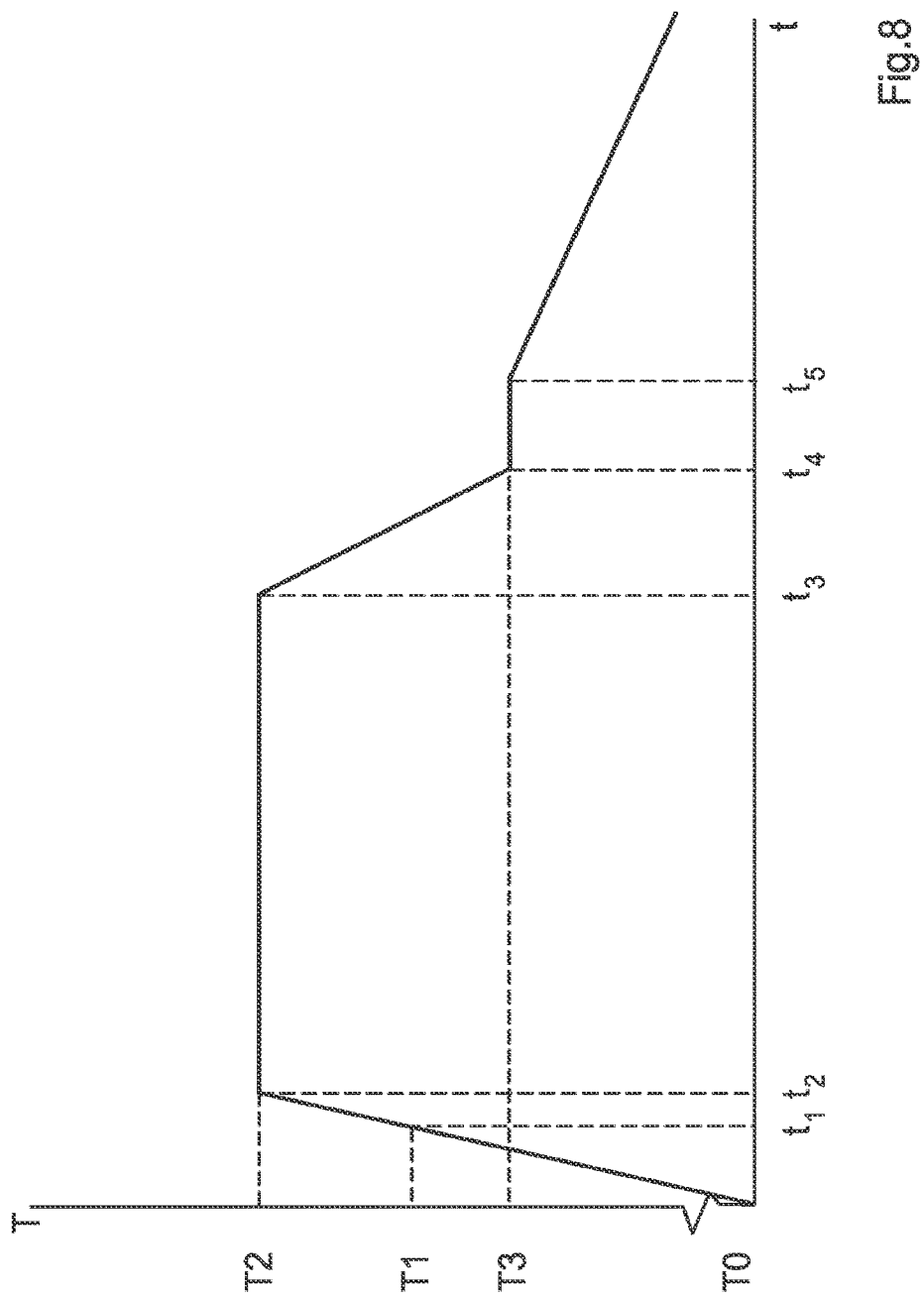

METHOD FOR CONSOLIDATING AN ADDITIVELY MANUFACTURED PIECE

CROSS REFERENCE TO RELATED APPLICATION

This Utility patent application is a divisional application of U.S. patent application Ser. No. 17/434,668, filed Aug. 27, 2021, which claims priority under 35 U.S.C. § 371 to International Application Serial No. PCT/EP2020/055365, filed Feb. 28, 2020, which claims the benefit of EP Application No. EP 19160819.9, filed Mar. 5, 2019, all of which are incorporated herein by reference.

FIELD OF THE INVENTION

The present invention concerns a method for consolidating an additively manufactured piece. In one preferred embodiment, the method according to the invention comprises the step of combining the additively manufactured piece with another piece, for example with another additively manufactured piece or with a piece that is not additively manufactured (e.g. an insert, foam, etc.), so that during the consolidation step, those pieces are assembled or connected together.

DESCRIPTION OF RELATED ART

Additive manufacturing is a production technique that allows to obtain a piece or a product from the generation and subsequent addition of material, e.g. and in a non-limitative way by subsequently adding different layers of material. On the contrary, traditional production techniques (as e.g. milling or turning) rely on the subtraction from a solid.

Filament winding, automated tape laying (ATL), automated fiber placement (AFP) and 3D printing are non-limitative examples of additive manufacturing technologies.

With additive manufacturing, it is possible to produce pieces having complex geometry. In this context, a complex geometry piece is a piece comprising at least one of the following features:
  double curvature (or non-developable surface);
  undercut;
  back taper;
  hole;
  pocket;
  internal cavity.

Slender elements, such as trusses of a lattice or scaffolds, are also not limitative examples of additively manufactured pieces having a complex geometry.

With additive manufacturing, it is possible to produce different kind of pieces. For example, it is possible to produce homogeneous pieces, i.e. pieces made of a homogeneous material. Non-limitative examples of homogeneous materials comprise thermoplastic, silicone, foam, liquid crystal polymer, thermoset, low-melting metals, etc.

With additive manufacturing, it is also possible to produce pieces made of a heterogeneous material as a composite material, i.e. a material comprising two or more phases with different physical properties. Usually, the different phases of a composite are made of different materials. However, there are exceptions in which the different phases are made of the same material.

A composite material comprises in general a homogeneous material reinforced by continuous and/or non-continuous fibers (e.g. fibers of carbon, aramid, glass, etc.) or nanoparticles (e.g. nanoparticles of metal, glass, polymer, sand, etc.). Reinforced sections can be present throughout the piece or can be concentrated locally, e.g. on the surface of the piece or in its center.

Additionally, with additive manufacturing it is possible to manufacture composite pieces made of multiple homogenous materials that are assembled or printed from multiple materials into one piece. For example, a 3D-printer may print a piece that consists of carbon fiber reinforced polymers layers, alternated by layers that are printed out of only plastic, foam or metal.

With additive manufacturing, it is possible to manufacture pieces that have objects/elements (e.g. inserts, foams, sensors, lattices) embedded. These objects can either be embedded during the additive manufacturing process (for example, by stopping the additive manufacturing process mid-way, adding an element, and resuming the process) or afterwards (for example, by pressing/adhering/locking an object into/onto the additively manufactured piece)

Integrity, interlaminar strength, low void content and, depending on material, crystallinity and chemical links are critical in an additively manufactured piece.

Additively manufactured pieces are then often consolidated after their manufacturing, so as to obtain the above-mentioned features.

In this context, consolidation of a piece means:
  bulk compaction and/or squeezing of the piece, allowing for example the air in the piece to be pressed out;
  fusion of the piece, or at least of one phase or material of the piece;
  and/or
  crystallization of the piece, if applicable.

It is known to use rigid or flexible pre-manufactured moulds to provide form and compression forces on an additively manufactured piece, so as to consolidate it.

The pre-manufactured mould containing the additively manufactured piece can be placed in a container as an autoclave, so as to raise the temperature and exert on the piece a pressure allowing to consolidate the piece. The piece can at the same time be inside a bag in which a vacuum is created. Other technologies or manufacturing routes contain thermoforming by a hot press or diaphragm forming.

The document "Flexible silicone moulds for rapid manufacturing of ultra-thin fiber reinforced structures" of A. Scholothauer et al., SAMPE Conference Proceedings, Long Beach, CA, May 21-24 2018, Society for the Advancement of Material and Process Engineering—North America, describes that ultra-thin fiber reinforced structures are consolidated by sandwiching them between pre-manufactured silicone moulds constrained by a metal cage. In this document, ultra-thin fiber reinforced structures are not additively manufactured.

In those known examples, a mould must be manufactured before the consolidation phase. Then, a preliminary step consisting of the manufacturing of the mould must be performed before the consolidation of the additively manufactured piece. This preliminary step renders the consolidation of the additively manufactured piece a complex, expensive and time-consuming procedure.

Moreover, in most of the cases this mould has a shape which does not perfectly fit the additively manufactured piece, i.e. it does not perfectly surround nor envelop the additively manufactured piece.

Moreover, this pre-manufactured mould comprises in general two parts to be connected together, so that when they are perfectly aligned, they allow to create an inner hollow having the shape of the piece. Any misalignment of the parts implies that the inner hollow has not the desired shape.

Moreover, the mould cannot be used for pieces having a shape different from the shape of this inner hollow. This is in particular important for complex geometries pieces, as they often require a plurality of moulds to be assembled to create the forming envelope.

Finally, the size and shape of the container in which the mould is placed and/or the size and shape of the opening through which the mould enters in the container must be adapted so that the mould can enter and be contained in the container.

Therefore, there is a need of a method for consolidating an additively manufactured piece simpler, less expensive and/or less time-consuming with regard to the known methods.

There is also a need of a method for consolidating an additively manufactured piece that can be used with any shape or size of a container and/or for any shape or size of the opening of the container.

There is also a need of a method for consolidating an additively manufactured piece having a complex geometry.

Moreover, it is sometimes necessary or useful to assemble or connect together an additively manufactured piece with another one (or more) piece(s), for example with another additively manufactured piece(s). This piece can also be a piece manufactured with a technique different from additive manufacturing. For example, it is sometimes necessary or useful to assemble or connect together an additively manufactured piece with sensors, honeycombs, inserts, etc.

There is also a need to provide a mechanical lock and/or to provide adherence between the pieces to be assembled, while improving the integrity of the connected pieces, in particular when the pieces cannot be chemically linked.

BRIEF SUMMARY OF THE INVENTION

According to the invention, these aims are achieved by means of a method for consolidating an additively manufactured piece comprising the steps of:
  placing the piece in a cavity of a thermally conductive container, the cavity being devoid of a mold and filling the cavity with a liquid or semi-liquid material, so that the material directly contacts at least an outer portion of the piece, by perfectly surrounding or enveloping this portion, this material being curable, having a maximum operating temperature higher than the lower melt temperature of the piece to be consolidated, and having a positive relative thermal coefficient of expansion;
  sealing the cavity;
  curing the material, so that the cured material restricts the movement of the piece in the cavity;
  heating the cavity, wherein while the temperature is increased, the cured material expands and then creates a pressure on the part, and wherein the temperature is increased until reaching a process temperature equal or higher than the lower melt temperature of the piece to be consolidated and lower than the maximum operating temperature of the material;
  maintaining the process temperature so as to consolidate the piece, wherein during the heating step and during the maintaining step, the cured material is an in-situ created monobloc mould for the piece.

The maximum operating temperature of the curable material in this context designates the maximum temperature belonging to the temperature range where the curable material is in a stable cured state, meaning it does not melt/soften/burn/deteriorate/degrade and/or lose at least 50% of the value of its critical mechanical properties (e.g. tensile strength, tensile modulus, hardness).

It must be understood that the step of placing the piece in a cavity of a thermally conductive container can be performed before, after and/or at the same time of the step of filling the cavity with a liquid or semi-liquid material, as long as after those two steps, independently on their order, the material directly contacts at least an outer portion of the piece, by perfectly surrounding or enveloping this portion.

The method for consolidating an additively manufactured piece is then completely devoid of a pre-manufactured mould. The mould is created by curing in-situ, i.e. in the cavity of the container, a curable material which surrounds or encapsulates at least a portion of the piece to be consolidated.

If the additively manufactured piece has a complex geometry, the in-situ created mould is geometrically complex as well. Therefore, the method according to the invention allows to create geometrically complex mould, which can hardly be manufactured with traditional techniques.

Then, the method according to the invention is devoid of a preliminary step consisting of the manufacturing of the mould. Therefore, the method according to the invention is simpler, less expensive and less time-consuming than known methods.

In a first step of the inventive method, the curable material is liquid or semi-liquid. According to the invention, the material directly contacts at least an outer portion of the piece, by perfectly surrounding or enveloping this portion. Therefore, the liquid or semi-liquid material perfectly fits the additively manufactured piece, i.e. it perfectly surrounds or envelops the additively manufactured piece.

In a second step, the curable material is cured. Therefore, it becomes solid.

The method according to the invention comprises the step of sealing the cavity. In this context, sealing means restricting the curable material in physical space so as to guarantee exertion of pressure on additive manufactured piece when expanding. A full airtight/liquid tight seal is possible but not necessarily needed. This step can be performed after of before the curing step, and preferably before the heating step.

The container is sealed and then heated to a temperature equal or higher than the lower melt temperature of the piece to be consolidated, but lower than the maximum operating temperature of the cured material. In one preferred embodiment, the container comprises or is connected to means for controlling the time and the temperature (and possibly the pressure, as will be discussed) during the heating step. In one embodiment, the heating function vs time is a linear function.

If the piece is made of a composite material comprising a matrix and reinforcement fibers, the lower melt temperature of the piece is in general the melt temperature of the matrix and the higher melt temperature of the piece is the melt temperature of the reinforcement fibers.

If the piece is made of a homogeneous material, there is only one melt temperature of the piece.

The material has a relative positive thermal coefficient of expansion, i.e. its positive thermal coefficient of expansion is higher than the thermal coefficient of expansion of the thermally conductive container. Therefore, once the cured material is heated, it expands in the cavity; the cavity as well expands but since it has a lower thermal coefficient of expansion, a substantially homogenous pressure on the piece is generated. During this expansion, the cured material remains solid.

During the heating step of the method according to the invention, while the temperature is increased, the cured material expands and then creates a pressure on the part, while maintaining close control of the geometry of the piece. In one embodiment, the geometry of the piece can be reduced during the heating step, for example, the piece might shrink 20% in one direction by being compacted. According to the invention, the temperature is increased until reaching a process temperature equal or higher than the lower melt temperature of the piece to be consolidated, but lower than the maximum operating temperature of the material.

The process temperature is then maintained so as to consolidate the piece.

According to the invention, during the heating step and during the maintaining step, the cured material is an in-situ created monobloc mould for the piece. It is the unique or sole mould in the cavity and it is created in the cavity, after the piece has been placed in the cavity.

Advantageously, the mould is monobloc. In other words, it does not comprise two distinct parts that, assembled together, allow to create an inner hollow having the shape of the piece, as in the known moulds. In other words, the method according to the invention does not suffer of the problem of the misalignment of the parts of a known mould. The inner hollow can have a complex geometry.

Since this material was introduced in the cavity when it was in a liquid or semi-liquid state, and since it becomes solid and then acts as mould after its introduction in the cavity, it can be used for any shape or size of the cavity and for any any shape or size of the opening of the container, as long as this opening allows the introduction of the piece in the cavity.

In one preferred embodiment, the liquid or semi-liquid material perfectly and completely surrounds or envelops the piece. Therefore, the shape of the inner hollow of the in-situ created and monobloc mould of the invention is exactly the shape of the piece.

In one preferred embodiment, the piece has a complex geometry, according to the definition here above. The method according to the invention allows the in-situ created mould to be adapted to this complex geometry piece.

In one embodiment, the method according to the invention comprises a step before the step of placing the piece in the cavity or in any case before the curing step, during which the outer surface (shell) of the piece is made crack free as much as possible, as to avoid the curable material to enter in the cracks and then break the piece during the curing step. In one preferred embodiment, this step comprises to manufacture the piece so that at least a portion of its outer surface is made of a crack free material only, e.g. of plastic. In another embodiment, this manufacturing step is performed as properly as possible, so that the bonding between the layers of the piece is crack free as much as possible.

In one preferred embodiment, the method according to the invention comprises the step of combining the additively manufactured piece with another piece, for example with another additively manufactured piece, so that during the consolidation step, those pieces are assembled or connected together. Since the pieces are combined, their at least partial fusion or adhesion during the heating step under the pressure of the expanded cured material allows the pieces to be connected together, while maintaining their geometry with the in-situ created mould. Advantageously, the pieces are connected while improving the integrity of the additively manufactured piece.

In one preferred embodiment, junction point(s) or area(s) of two or more pieces are seal-tight before the curing step, so as to avoid curable material to enter in between and then separate the pieces. In one embodiment, the pieces before the curing step are at least partially covered by a crack free material (e.g. plastic), e.g. by a sheet of crack free material or by spraying a crack free material on at least a portion of the outer surface of the pieces.

In one preferred embodiment, the method according to the invention comprises the step of positioning the piece(s) in the cavity by using positioning means. Examples of positioning means comprise spacers, holders, pins, etc.

In one preferred embodiment, the method according to the invention comprises the step of cooling the cavity. In one preferred embodiment, the step of cooling comprises:
 cooling the cavity so as to reach a predetermined temperature;
 maintaining this predetermined temperature for a time interval;
 cooling the cavity so as to reach the room temperature.

In one preferred embodiment, the piece comprises a matrix, e.g. a thermoplastic matrix, and this predetermined temperature is the glass transition temperature of the thermoplastic matrix. While maintaining the glass transition temperature, residual stresses of the piece are released.

In one preferred embodiment, the method according to the invention, after the cooling step, comprises the step of separating the consolidated piece(s) from the cured material.

In one preferred embodiment, the separating step comprises programming the path planning of a tool (e.g. a knife, a drill, a mill etc.) based on a 3D model file that was entered by the user and/or by probing and/or by scanning the piece prior to the curing step.

In one preferred embodiment, the container comprises or is connected to means for controlling the pressure in the cavity, during the heating step. In one preferred embodiment, the container comprises or is connected to a piston so as to generate a controlled force or a controlled pressure on the piece during the heating step. In one embodiment the piston is or is contained in a lid of the container, closing its opening.

In one preferred embodiment, the method comprises the step of filling the cavity with a filler before the curing step. For example, the top of a piece can be held in place, while the bottom part is surrounded by curable material. Afterwards, the rest of the cavity is filled with a filler.

In another embodiment, the piece (which may or may not be held in place) will be surrounded by filler material (e.g. granulates) first, after which the (entire) cavity is filled up with curable material, filling up the cavities left open by the filler material. In another embodiment, the curable material may be non-homogenous and partly comprising filler, e.g. as small particles in the liquid or semi-liquid curable material.

In one preferred embodiment, the filler comprises a previously cured material that has been pre-processed before re-using it as a filler, e.g. so as to reduce it in granulate. Then, in this embodiment the method according to the invention comprises the steps of:
 pre-processing a previously cured material;
 filling the cavity with the pre-processed previously cured material.

In another embodiment, sand, plastic and/or metal particles can be used as a filler.

In one preferred embodiment, the container is defined by a lateral frame and a bottom portion. It defines a cavity. In one preferred embodiment, the bottom portion comprises a build platform for the piece on which the piece has been additively manufactured. In another embodiment, the top portion and/or the lateral frame comprise this build platform. This has the advantage that, after the piece is additively manufactured on the build platform, the build platform supporting the piece can be directly used for both placing the piece in the container and for at least partially closing the opening of the container through which the piece has been entered in the container. In another embodiment the build platform supporting the piece is used only for placing the piece, a lid allowing to close the opening of the container.

The present invention concerns also a system for consolidating an additively manufactured piece comprising:
- a thermally conductive container, comprising a cavity, the cavity comprising an additively manufactured piece and a liquid or semi-liquid material, so that this material perfectly surrounds or envelops at least a portion of this piece, the material being curable, having a maximum operating temperature higher than the lower melt temperature of the piece to be consolidated, and having a positive relative thermal coefficient of expansion,
- sealing means for sealing the cavity,
- curing means for curing the material, so that the cured material restricts the movement of the piece in said cavity,
- temperature controlling means for heating the cavity, wherein while the temperature is increased, the cured material expands and then create a pressure on the piece, and wherein the temperature is increased until reaching a process temperature equal or higher than the lower melt temperature of the piece to be consolidated and lower than the maximum operating temperature of the material, those temperature controlling means being arranged also for maintaining the process temperature so as to consolidate said piece, wherein during the heating and during the maintaining, the cured material is an in-situ created monobloc mould for the piece.

Brief description of the drawings

The invention will be better understood with the aid of the description of an embodiment given by way of example and illustrated by the figures, in which:

FIG. 4A shows a perspective view of four different embodiments of additively manufactured pieces to be assembled.

FIG. 8 shows an example of the variation in time of the temperature of the system according to the invention.

DETAILED DESCRIPTION

Figure 1:
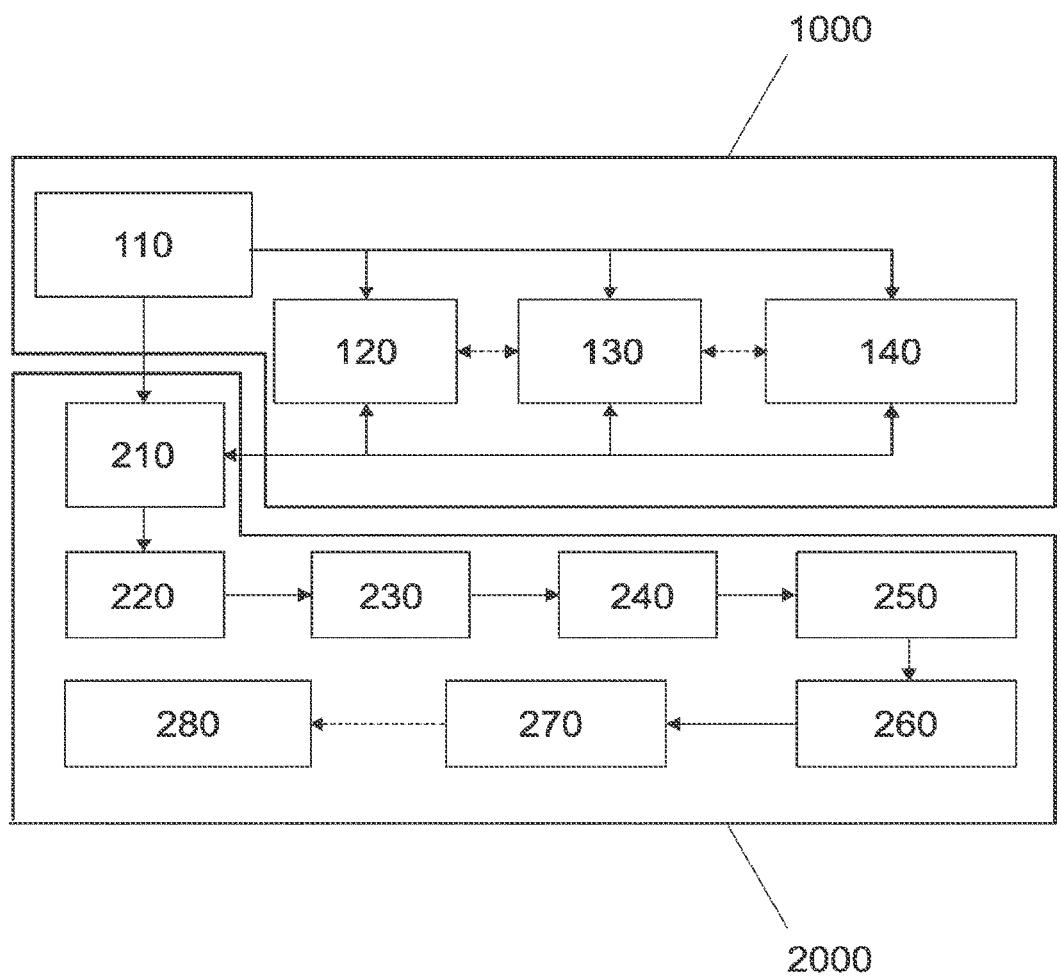
FIG. 1 shows a schematic view of the steps of an embodiment of the method according to the invention.

FIG. 1 shows a schematic view of the steps of an embodiment of the method according to the invention. The reference 1000 indicates an example of the steps performed for preparing the piece to be consolidated, before entering the piece in a cavity of a container. The reference 2000 indicates an example of the steps performed after this preparing 1000.

The steps 1000 and 2000 are made up by operations and movements that are preferably executed sequentially, as indicated by the sense of the arrows.

Those operations and movements can be executed in a manual, semi-automatic or fully-automatic manner. Semi or fully automatic operations or movements can be driven by direct feedback from, e.g. sensors, user input or self-learning algorithms, or by preconfigured settings.

In the example of FIG. 1, first, the piece is manufactured in step 110. The piece according to the invention is additively manufactured e.g. by automated filament winding, automated tape laying (ATL), automated fiber placement (AFP) or 3D printing. Elements may have been embedded into the piece during the additive manufacturing process (for example, the process may have been stopped mid-way to embed a foam core into the partly done additively manufactured piece, after which the additive manufacturing process is resumed to enclose the foam).

The piece to be consolidated with the method according to the invention can be made by homogenous and/or composite material. An example of this piece is given in FIG. 2.

Figure 2:
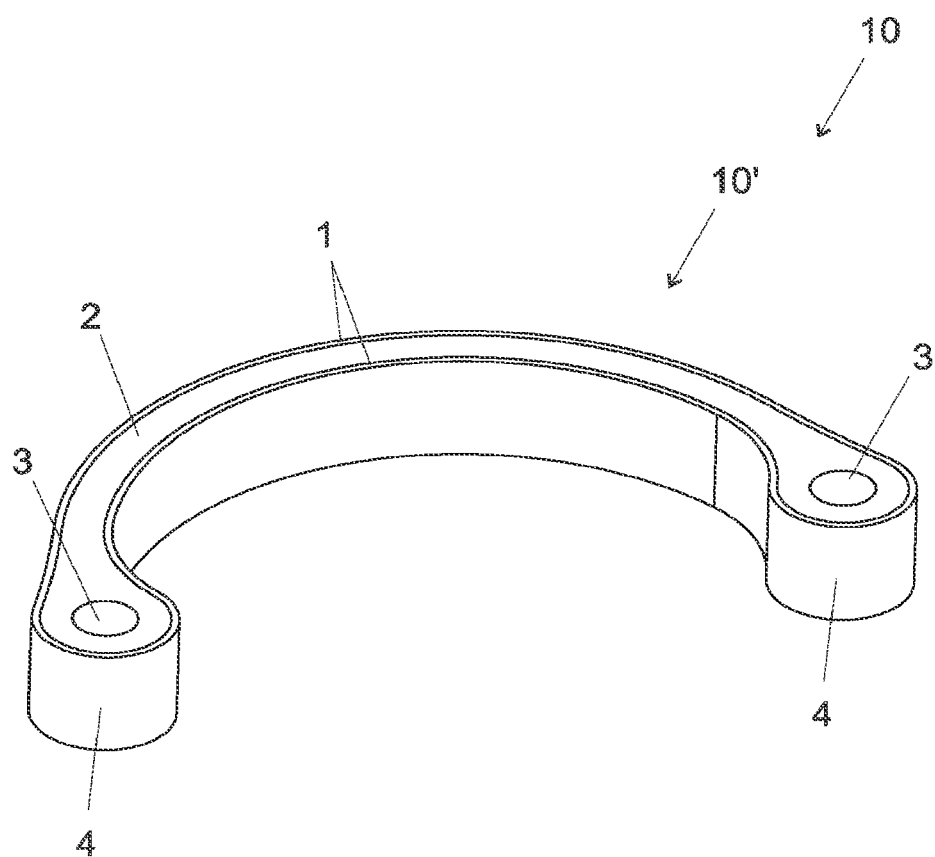
FIG. 2 shows a perspective view of an embodiment of an additively manufactured piece to be consolidated.

FIG. 2 shows a perspective view of an embodiment 10' of an additively manufactured piece 10 to be consolidated. In this example, the piece is a bracket 10' having a curved shape and two ends 4, each end 4 comprising a hole 3.

The bracket 10' comprises an outer lateral surface (perimeter) 1 and a core 2. In one embodiment, the lateral surface 1 and the core 2 are made of a homogeneous material, e.g. plastic. In another embodiment, the lateral surface 1 and the core 2 are made of a heterogeneous material, e.g. carbon fiber reinforced plastic. In another embodiment, the lateral surface 1 and the core 2 are made of different materials: for example, the lateral surface 1 can be made of hybrid plastic and the core 2 by carbon fiber reinforced plastic, or vice-versa.

With the method according to the invention it is possible also to consolidate and at the same time assemble or connect together multiple pieces. At least one and possibly all those pieces is (are) additively manufactured.

In other words, the pieces can be combined before consolidating them. During their combination, connection means can be used (if possible) for maintaining the relative position between the pieces so as to handle the composed piece. Connection means comprise mechanical locks, adhesives, fasteners, knitting, etc.

In one preferred embodiment, the method according to the invention not only allows the consolidation of at least one of those pieces, but it allows also the connection of the combined pieces together so that they form a monobloc piece.

Those pieces can be chemically linked or cannot be chemically linked. An example of pieces that can be chemically linked is given in FIGS. 3A and 3B.

Figure 3A:
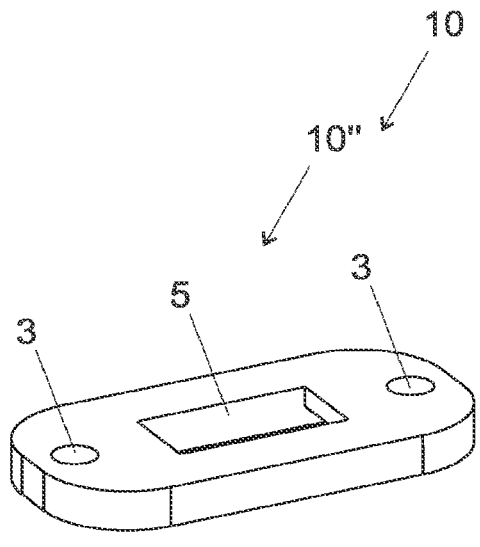
FIGS. 3A and 3B show a perspective view of two embodiments of additively manufactured pieces to be assembled.
Figure 3B:
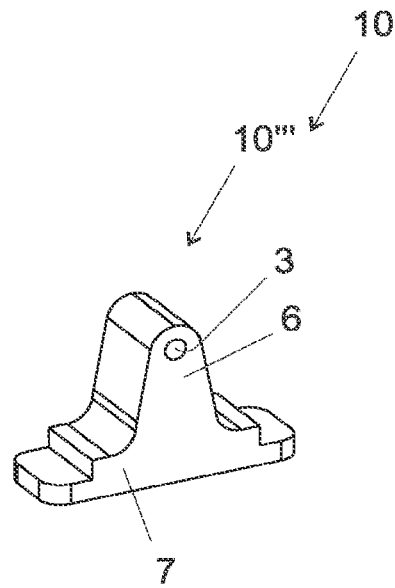
Figure 3C:
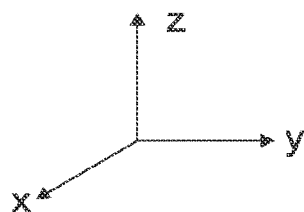
FIG. 3C shows a perspective view of the pieces of FIGS. 3A and 3B once assembled.
Figure 3C:
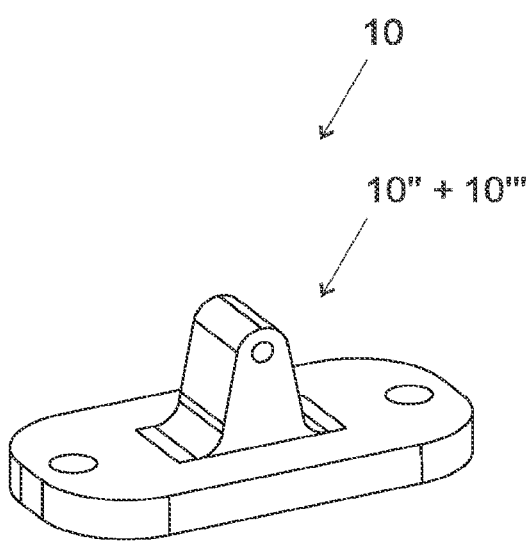

FIGS. 3A and 3B show a perspective view of two embodiments of additively manufactured pieces 10. They are the components of a two-components bracket, visible in FIG. 3C.

The first component 10" of the bracket, visible in FIG. 3A is substantially planar and comprises two holes 3 and an aperture 5 arranged for receiving the protruding part 6 of the second component 10''' of the bracket visible in FIG. 3B. The second component 10''' of the bracket has a complex geometry, comprising a base 7 and a protruding part 6 having a complex lateral shape. It comprises also a hole 3. The first component 10'' can be manufactured with 3D printing, e.g. by stacking layers in the z direction, each layer belonging to the x-y plane. The second component 10' can be manufactured with 3D printing e.g. by stacking layers in a plane perpendicular to the x-y plane, e.g. the x-z plane or the z-y plane. Therefore, for obtaining the bracket represented in FIG. 3C, it is necessary to assemble the first component 10'' of FIG. 3A with the second component 10' of FIG. 3B, as they are manufactured in different planes. In other words, manufacturing the bracket of FIG. 3C as a monobloc additively manufactured piece without assembling different parts can be difficult or even impossible.

With the method according to the invention it is possible also to assemble or connect together multiple pieces that cannot be chemically linked. At least one and possibly all those pieces is(are) additively manufactured. The method according to the invention establishes a mechanical lock and/or provides adherence between those pieces. An example is given FIGS. 4A and 4B.

Figure 4B:
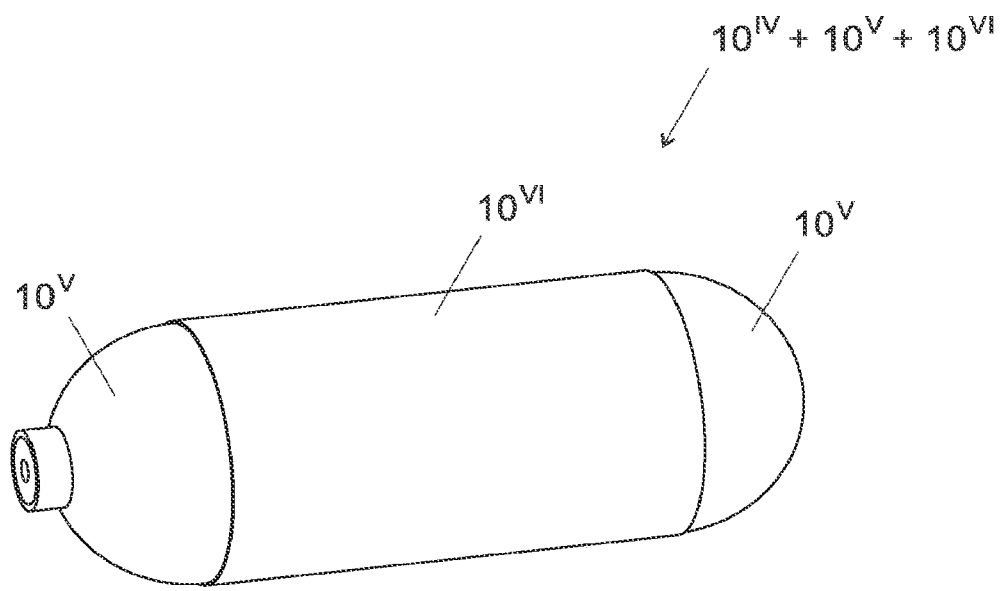
FIG. 4B shows a perspective view of the pieces of FIG. 4A once assembled.

FIG. 4A shows a perspective view of four different embodiments of additively manufactured pieces to be assembled. Once assembled, they form a pressure vessel, visible in FIGS. 4B and 4C.

A metal core $10^{iv}$, e.g. a printed metal core or a core manufactured with other techniques, is encapsulated by two printed carbon fiber end cups $10^v$, as illustrated by the arrows F1. A printed carbon fiber hollow cylinder (sleeve) $10^{vi}$ is then inserted on the encapsulated metal core, as illustrated by the arrows F2. The obtained pressure vessel is illustrated in in FIG. 4B. In this example, the pieces $10^{iv}$, $10^v$ and $10^{vi}$ cannot be chemically linked.

As will be discussed, the method according to the invention allows the metal core 10' to adhere to the two printed carbon fiber components $10^v$ and the printed carbon fiber components $10^v$ and the printed carbon fiber hollow cylinder $10^{vi}$ to cohere.

If the additively manufactured pieces 10 must be assembled as in the examples of FIGS. 3B and 4B, the method comprises the step 120 of combining at least one additively manufactured piece with another piece, possibly with another additively manufactured piece.

It is also sometimes necessary or useful to insert or encapsulate one or more functional elements in an additively manufactured piece or in a group of combined pieces, comprising at least one additively manufactured piece.

Non-limitative examples of such functional elements comprise:
 elements for enhancing a function as e.g. fasteners, sensors, actuators, cables, etc.;
 elements for enabling load introduction as e.g. inserts; and/or
 elements for increasing mechanical properties, e.g. metal, ceramic, glass, fiber reinforced plastic rods and/or other structures. These elements may be partially inserted and/or may be encapsulated only when multiple pieces are assembled.

In one preferred embodiment, those elements have a melt point higher than the process temperature.

It is also sometimes necessary or useful to embed one or more structural core in the additively manufactured piece, e.g. a lattice, foam and/or honeycomb core.

In one preferred embodiment, the core has a melt point higher than the process temperature.

The step of embedding a core is illustrated by the reference 130 in FIG. 1. The step of adding elements or inserts is illustrated by the reference 140 in FIG. 1.

Preparing the piece 10 can include also to create in the piece 10 air channels (not illustrated) so as to accommodate air leaving the piece 10 during its consolidation.

Preparing the piece 10 can include a step during which the outer surface (shell) of the piece 10 is made crack free as much as possible, as to avoid the curable material to enter in the cracks and then break the piece 10 during the curing step. In one preferred embodiment, this step comprises to manufacture the piece 10 so that at least a portion of its outer surface is made of a crack free material only, e.g. of plastic. In another embodiment, this manufacturing step is made as proper as possible, so that the bonding between the layers of the piece 10 is crack free as much as possible.

In one embodiment, preparing the piece 10 can include a step during which the piece 10 is put into an air tight bag, which covers the outer shell of the piece 10. This air tight bag may be connected to the ambient environment outside the cavity through a channel (e.g. a tube), as to accommodate air escaping from the bag that escapes from the piece 10 during the consolidation step. The air tight bag can in this embodiment also be held under vacuum by generating an under pressure through the channel, which in this case would be connected to a vacuum pump.

In another embodiment, at least part of the piece 10 is covered by and/or wrapped into an airtight seal/sheet.

The presence of an air tight bag, seal and/or sheet allows to avoid the curable material 30 to enter in possible cracks in piece 10 and then break the piece 10 during the curing step.

If combined pieces must be consolidated, after their combination junction point(s) or area(s) of two or more pieces are seal-tight, so as to avoid curable material to enter in between and the separate pieces. In one embodiment, the pieces before the curing step are at least partially covered by a crack free material (e.g. plastic), e.g. by sheet a crack free material or by spraying a crack free material on at least a portion of the outer surface of the pieces.

Figure 5A:
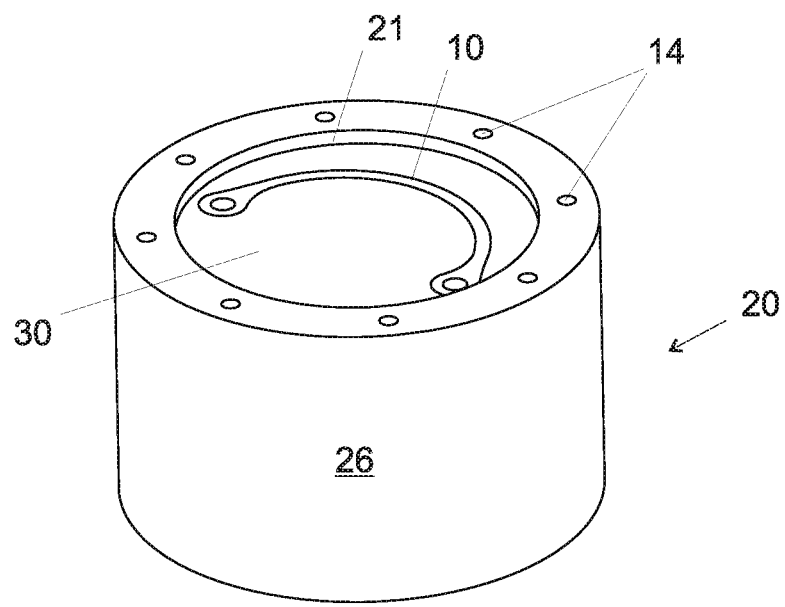
FIG. 5A shows a perspective view of an embodiment of the system according to the invention.

Once the piece (or the combined pieces) 10 has been prepared, it is placed in a cavity of a container, e.g. in the cavity 21 of the container 20 illustrated in FIG. 5A. In this example, the container 20 has a lateral surface 26 and a bottom surface 28, defining the cavity 21. A lid 22, visible in FIG. 5B, can be connected to the lateral surface 26 so as to close the cavity 21 and then the container 20 by fixation means (in this examples, screws 40 cooperating with holes 14 in the container 20).

The illustrated container 20 is substantially cylindrical, but any other shape or size of the container can be imagined. It can also have a variable volume.

The container 20 is (at least partially) made of a thermally conductive material. In one preferred embodiment, it is metallic.

The container 20 is arranged so as to support high pressures, i.e. pressures belonging to the range 1 Bars-10 Bars or higher, typically in the range 3 Bars-7 Bars.

In one embodiment, part of the container 20 and/or its lid 22 can be perforated so as to accommodate during the consolidation step air exchange with the surrounding environment. In one preferred embodiment, those (not illustrated) perforations should not inhibit pressure build-up in the container 20.

In one preferred embodiment, the method according to the invention comprises the step of positioning the piece(s) 10 in the cavity 21 by using (not illustrated) positioning means. Examples of positioning means comprise spacers, holders, pins, etc.

Figure 7A:
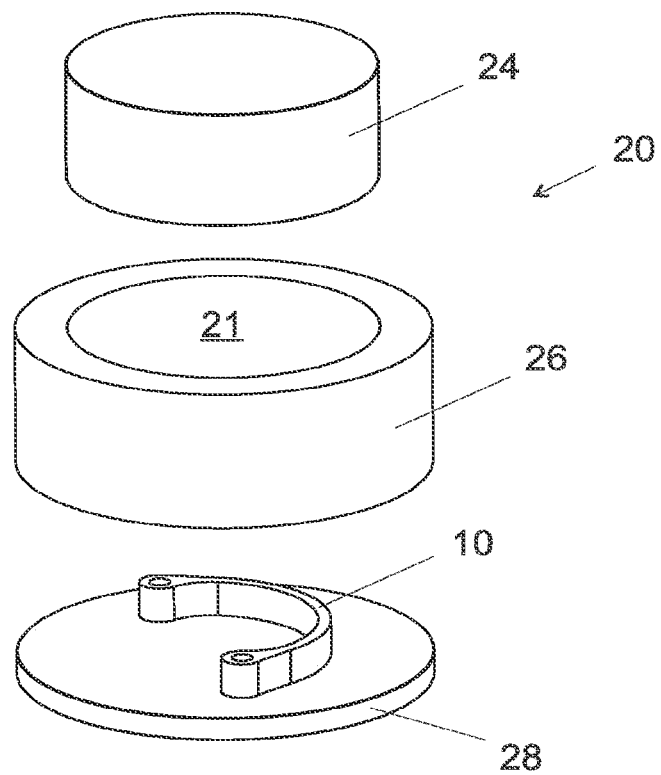
FIG. 7A shows an exploded view of another embodiment of the system according to the invention.
Figure 7B:
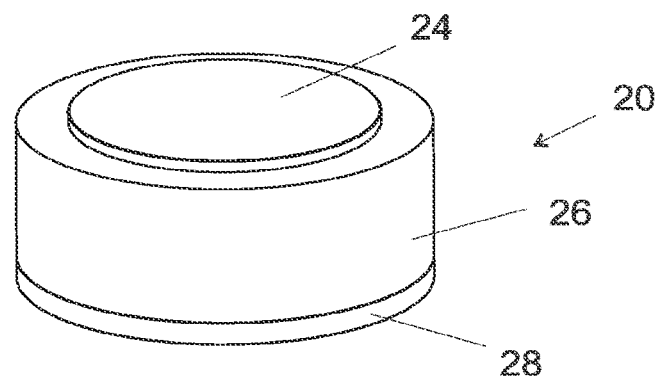
FIG. 7B shows perspective view of the system of FIG. 7A once assembled.

In one preferred embodiment, illustrated in FIGS. 7A and 7B, the bottom portion of the container 20 comprises a build platform 28 for the piece 10, on which the piece has been additively manufactured. In another embodiment, the lid and/or the container lateral frame comprise this build platform. This has the advantage that, after the piece 10 is additively manufactured on the build platform 28, the build platform 28 supporting the piece 10 can be directly used for both placing the piece in the cavity 21 and for at least partially closing the opening of the cavity 21 through which the piece 10 has been entered in the cavity 21. In another embodiment the build platform supporting the piece is used only for placing the piece, another lid allowing to close the opening of the container.

In one embodiment, the piece 10 is automatically stuck on the build platform 28 during the manufacturing step 110. In another embodiment, connection means (as adhesive, glue, etc.) are used for connecting the build platform 28 to the piece 10.

The cavity 21 is at least partially filled with a liquid or semi-liquid material 30, before or after positioning piece 10 into the cavity 21, so that the material 30 directly contacts at least an outer portion of the piece 10, by perfectly surrounding or enveloping this portion. In one preferred embodiment, it completely surrounds the piece 10.

In one embodiment, air channels (not illustrated) are added to or created in the curable material 30, before or after the curing step, as to accommodate air leaving the piece 10 during the consolidation step to leave the cavity 21, or at least so as to not trap air leaving the piece 10 between the monobloc mould and the piece 10. This improves the compaction and fusion of the piece 10.

According to the invention, this material 30 is curable, has a maximum operating temperature higher than the lower melt temperature of the piece to be consolidated, and has a positive relative thermal coefficient of expansion. In one preferred embodiment, it does not degrade, soften, deteriorate, melt and/or burn with high pressures, i.e. pressures belonging to the range 1 Bars-10 Bars or higher.

Examples of this material 30 comprises rubber (e.g. natural or synthetic), silicone, elastomer, thermoplastic, thermoset and/or starch based elastomers or plastics (biodegradable).

If the cavity 21 is not completely filled by the material 30, a filler (not illustrated) can be used for filling the remaining volume or vice versa.

In one preferred embodiment, the filler comprises a previously cured material 30 that has been pre-processed before re-using it as a filler, e.g. so as to reduce it in granulate.

In another embodiment, sand, plastic and/or metal particles can be used as a complementary or alternative filler and may be added to the material 30 before filling the cavity 21.

The placing step and the filling step form the potting step 210 of FIG. 1.

Figure 5B:
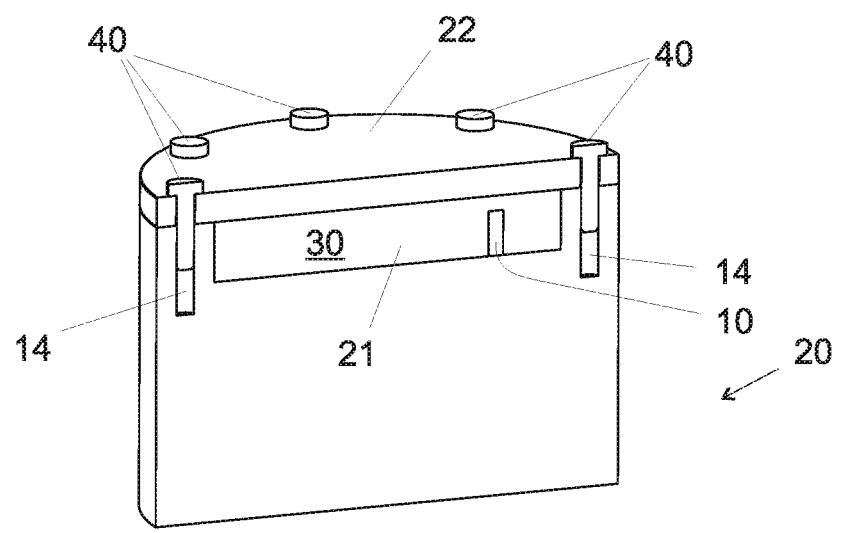
FIG. 5B shows a cross section view of the system of FIG. 5A.

The cavity 21 is then sealed, e.g. by closing the open part of the container 20 with a lid 22, visible in FIG. 5B (step 220). In another embodiment, the sealing step is performed after the curing step.

Mechanical, electrical and/or magnetic forces can be used so as to restrict expansion of the cured material 30 to build up pressure in the cavity 21.

The material 30 is then cured, so that the cured material 30 restricts the movement of the piece 20 in the cavity 21. Depending on substance's curing properties, its curing can be performed by, e.g. time, exposure to gas(es), exposure to UV and/or to heat. Since the curable material is cured, it becomes solid.

The container 20 (and then its cavity 21) is then heated to a temperature equal or higher than the lower melt temperature of the piece to be consolidated, but lower than the maximum operating temperature of the material. In one embodiment, the heating step is 30 seconds to 5 minutes long. In one preferred embodiment, the container 20 comprises or is connected to means (not illustrated) for controlling the time and the temperature and possibly the pressure in the cavity 21 during the heating step.

The heating step is illustrated in FIG. 1 by the reference 240. FIG. 8 shows an example of the variation in time of the temperature of the container 20 (and then of the cavity 21).

During the heating step 240, the heat causes expansion, reduction, relative movement and/or deformation of the cured material 30 and of the piece 10, depending on relative heat expansion coefficient and other physical properties.

Since the material 30 has a positive thermal coefficient of expansion, once the cured material is heated, it expands in the cavity 21 so as to generate a substantially homogenous pressure on the piece 10. During this expansion, the cured material remains solid and maintains close control of the geometry of the piece 10.

Figure 6:
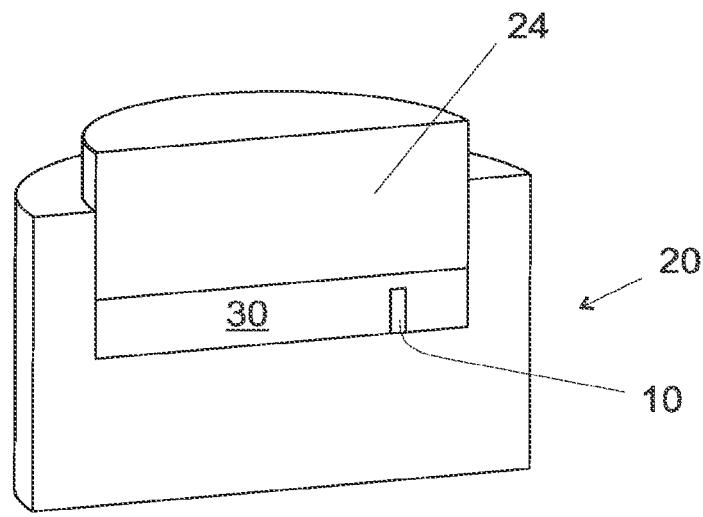
FIG. 6 shows a cross section view of another embodiment of the system according to the invention.

In one preferred embodiment, the container 20 comprises or is connected to means for controlling the pressure in the container during the heating step. In one preferred embodiment, the container comprises or is connected to a piston so as to generate a controlled force or a controlled pressure on the piece during the heating step. In one embodiment, illustrated in FIG. 6 or in FIGS. 7A and 7B, the piston 24 is or is contained in a lid of the container, closing its opening.

Although FIGS. 7A and 7B illustrate the presence of means for controlling the pressure (as the piston 24) with a build plate 28, it must be understood that the presence of both features is not necessary. In one (not illustrated) embodiment, only the build plate 28 is present, the container being devoid of means for controlling the pressure of the cavity 21.

In the example of FIG. 8, the temperature T1 is the melt temperature of the matrix of a composite additively manufactured piece 10. In one example, T1 belongs to the range 150° C.-400° C., for example T1=200° C. Once T1 is reached, in general after about 15 minutes, thermoplastics melt and the piece 10 starts to consolidate (its air is pressed out, the piece is compacted) and fuse (more linkage between polymers). If there are combined composite additive manufacture pieces 10 in the cavity 21, the pieces 10 start also to join together.

According to the invention, the temperature is increased until reaching a process temperature equal or higher than the lower melt temperature of the piece to be consolidated, but lower than the maximum operating temperature of the material.

To create more pressure on the piece(s) 10, the temperature can be increased so to a process temperature T2, to expand cured material more. More pressure could mean also better consolidation. In one example, T2 belongs to the range 200° C.-400° C., for example T2=250° C.

In the example of FIG. 8, T2>T1. However, T2 can be equal to T1.

The process temperature T2 is then maintained for a certain time interval ($t_3$-$t_2$), typically ranging from 30 minutes to 6 hours, so as to consolidate the piece 10. The consolidation step is illustrated in FIG. 1 by the reference 250.

Consolidation takes place also due to the homogenous pressure that is applied to piece(s) 10. This consolidation step 250 causes fusion (bonding), compaction and/or crystallization of or within piece(s) 10 and can result in air leaving the piece(s) 10.

Figure 4C:
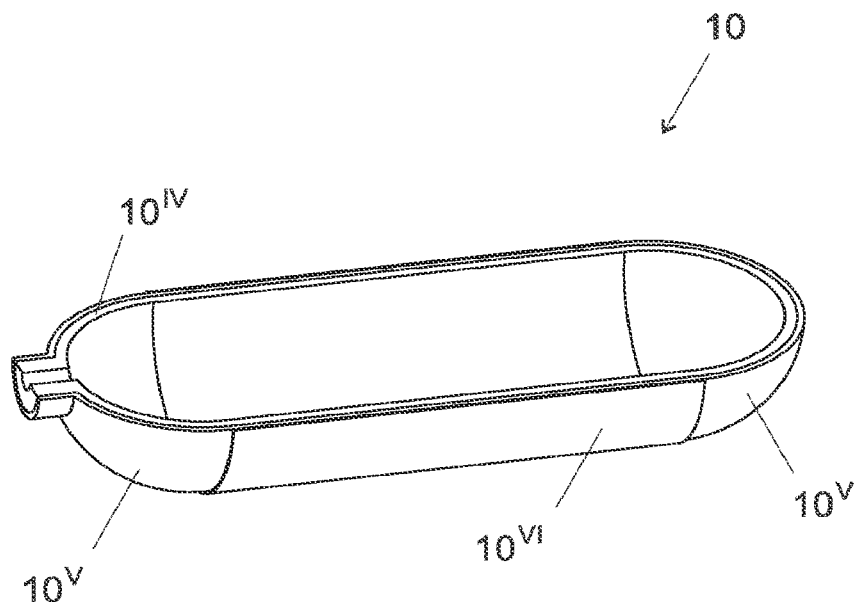
FIG. 4C shows a cross section view of the assembled pieces of FIG. 4B.

For example, the method according to the invention allows the printed metal core 10' of FIGS. 4A to 4C to adhere to the two printed carbon fiber components 10$^v$ and the printed carbon fiber components 10$^v$ and the printed carbon fiber hollow cylinder 10$^{vi}$ to cohere.

According to the invention, during the heating step and during the maintaining step, the cured material 30 is an in-situ created monobloc mould for the piece 10. It is the unique or sole mould in the cavity 21 and it is created in the cavity 21, after the piece has been placed in the cavity 21.

In one embodiment, the material 30 filling the cavity can be a recycled material, i.e. a material that has been cured and that has been processed so as to come back to a liquid or semiliquid and still curable state.

In the embodiment of FIG. 1, the consolidation step 250 is followed by a cooling step 260.

In one preferred embodiment, as visible in FIG. 8, the step of cooling 260 comprises:
- cooling the container 20 (and then the cavity 21) so as to reach a predetermined temperature T3; the time interval ($t_4$-$t_3$) typically ranges from 10 minutes to 2 hours;
- maintaining this predetermined temperature for a time interval ($t_5$-$t_4$); the time interval ($t_5$-$t_4$) typically ranges from 10 minutes to 1 hour;
- cooling the 20 (and then the cavity 21) so as to reach the room temperature T0, within in general 1 hour.

In one preferred embodiment, the piece comprises a matrix, e.g. a thermoplastic matrix, and this predetermined temperature T3 is the glass transition temperature of the thermoplastic matrix. The difference in the coefficients of thermal expansion between the fibers and the (e.g. thermoplastic) matrix as well as the density change for semi-crystalline polymers may lead to residual stresses and warping. To prevent this and to relieve such residual stresses, the glass transition temperature T3 is maintained for a time interval ($t_5$-$t_4$). This applies also for a piece made of a homogeneous material as well. In one example, T3 belongs to the range 50° C.-350° C., for example T3=100° C.

In one embodiment, the cooling rate during the time interval ($t_4$-$t_3$) is lower than the cooling rate after $t_5$. Typical cooling rates range from 5° C./min to 50° C./min.

In one preferred embodiment, the method according to the invention, after the cooling step, comprises the step of separating the consolidated piece(s) from the cured material. This step is illustrated in FIG. 1 by the reference 270.

In one preferred embodiment, the separating step comprises programming the path planning of a tool (e.g. a knife, a drill, a mill etc.) based on a 3D model file that was entered by the user and/or by probing and/or by scanning the piece prior to the curing step.

Once the in-situ created mould is separated from the piece 10, it can be optionally reused as a tradition mould or shredded to be used as granular filler.

Optionally, post-processing may take place to clean, surface smoothen, paint and/or coat the consolidated piece(s) 10 (step 280 in FIG. 1).

REFERENCE NUMBERS USED IN THE DRAWINGS

1 Outer lateral surface of the bracket
2 Core of the bracket
3 Hole
4 End of the bracket
5 Aperture of the first component of a bracket
6 Protruding part of the second component of a bracket
7 Base of the second component of a bracket
10, Additively manufactured piece
10' to 10$vi$ Examples of additively manufactured pieces
10' Bracket
10" First component of a bracket
10''' Second component of a bracket
10' Printed metal core of a pressure vessel
10$y$ Printed carbon fiber components
10' Printed carbon fiber hollow cylinder
14 Holes of the container
20 Container
21 Cavity of the container
22 Lid
24 Means for generating a controlled pressure in the container (piston)
26 Lateral surface of the container
28 Build plate
30 Curable material
40 Fixation means (screw)
110 Piece additive manufacturing step
120 Combining pieces step
130 Embedding core step
140 Adding elements step
250 Consolidating step
260 Cooling step
270 Separating step
280 Post-processing step
1000 Steps for preparing the piece to be entered in the cavity
2000 Steps after preparing the piece to be entered in the cavity
F1, F2 Arrow
T0 Room temperature
T1 Matrix (thermoplastics) melt temperature
T2 Process (consolidation) temperature
T3 Matrix (thermoplastics) glass transition temperature
t1 to t6 Time
1 Reinforcement fibers
2 Matrix
3 Hole
4 Aperture
10, 10' to 10$^{vi}$ Additively manufactured piece
14 Holes of the container
20 Lateral surface of the container
22 Top surface of the container (lid)
24 Means for generating a controlled pressure in the container (piston)
28 Bottom surface of the container
30 Curable material
40 Fixation means (screw)
110 Potting piece step
120 Sealing step
130 Curing step
140 Heating step
150 Consolidating step
160 Cooling step
170 Separating step
180 Post-processing step
210 Piece additive manufacturing step
220 Combining pieces step
230 Embedding core step
240 Adding elements step
T0 Room temperature T1 Matrix (thermoplastics) melt temperature
T2 Process (consolidation) temperature
T3 Matrix (thermoplastics) glass transition temperature
t1 to t6 Time

The invention claimed is:

1. A method for consolidating an additively manufactured piece, the method comprising:
    placing an assembly in a cavity of a thermally conductive container, the assembly comprising a first piece and a second piece with one or more of the first and the second pieces being additively manufactured;
    filling the cavity with one of a liquid and a semi-liquid curable material which directly contacts and completely surrounds the assembly, the curable material having a maximum operating temperature higher than a lower melt temperature of at least one of the first and the second pieces of the assembly, and having a positive thermal coefficient of expansion relative to the container,
    sealing the cavity;
    curing the curable material so that the cured material restricts movement of the assembly in the cavity;
    heating the container to increase the temperature within the container to cause the cured material to expand and create a pressure on the assembly, wherein the temperature is increased by the heating until the temperature reaches a process temperature equal or higher than the lower melt temperature of at least one of the first and the second pieces of the assembly and lower than the maximum operating temperature of the cured material; and
    maintaining the process temperature within the container for a time interval to consolidate the assembly;
    wherein during the heating of the container and maintaining the process temperature for the time interval, the cured material forms an in-situ monobloc mold for the assembly.

2. The method of claim 1, wherein the first piece comprises layers stacked in a first direction and the second piece comprises layers stacked in a second direction perpendicular to the first direction.

3. The method of claim 1, further comprising manufacturing one or more of the first piece and the second piece on a build platform,
    wherein placing the assembly in the cavity comprises placing the build platform on which one or more of the first piece and the second piece are manufactured and the first piece and the second piece in the cavity.

4. The method of claim 1, wherein the assembly comprises one or more functional elements comprising one or more of an insert, a sensor, an actuator, a cable, and a fiber-reinforced rod.

5. The method of claim 1, wherein at least one of the first and the second pieces comprise one or more of an insert, a sensor, an actuator, a cable, and a fiber-reinforced rod inserted therein.

6. The method of claim 1, wherein one or more of the first piece and the second piece comprise an outer lateral surface and a core, wherein one of the lateral surface and the core is made of a homogeneous material and the other of the lateral surface and the core is made of a heterogeneous material.

7. The method of claim 6, wherein the heterogeneous material is a carbon fiber-reinforced plastic.

8. The method of claim 1, further comprising scanning one or more of the first and the second pieces prior to the curing step.

9. The method of claim 1, further including generating a tool path plan for separating the consolidated assembly from the cured material based on one or more of a 3D model and a scanning of one or more of the first and the second pieces.

10. The method of claim 9, further comprising separating the consolidated assembly from the cured material using one or more of a knife, a drill, and a mill following the tool path plan for separating the consolidated assembly from the cured material.

11. The method of claim 1, further comprising a step of separating the consolidated assembly from the cured material.

12. The method of claim 1, wherein the first piece has a protruding part and the second piece has an aperture to receive the protruding part.

13. The method of claim 1, wherein the assembly forms a bracket.

14. The method of claim 1, further comprising additively manufacturing one or more of the first piece and the second piece using one or more of a filament winding process, an automated tape laying process, an automated fiber placement process, and a 3D printing process.

15. The method of claim 14, further comprising embedding a structural core into one or more of the first piece and the second piece, wherein the structural core comprises one or more of a lattice, a foam, and a honeycomb core.

16. The method of claim 1, wherein one or more of the first and the second pieces comprise a fiber-reinforced plastic.

17. The method of claim 1, further comprising cooling the cavity, including:
    cooling the cavity to reach a predetermined temperature;
    maintaining the predetermined temperature for a time interval; and
    further cooling the cavity to reach a room temperature.

18. The method of claim 1, further comprising connecting a third piece with one or more of the first and the second pieces during the maintaining of the process temperature.

19. The method of claim 1, further comprising generating a controlled pressure on the assembly during the heating of the container.

20. The method of claim 1, further comprising filling the cavity with a cured filler material before the curing of the curable material.

21. The method of claim 1, further comprising controlling a piston facing the cavity for generating a controlled force or pressure on the assembly.

* * * * *